United States Patent Office

2,728,750
Patented Dec. 27, 1955

---

2,728,750

COPOLYMERS OF CYCLIC MONOMERIC DISULFIDES AND UNSATURATED MONOMERS

Arthur V. Tobolsky, Princeton, N. J., and Theodore H. Meltzer, Levittown, Pa., assignors, by mesne assignments, to Thiokol Chemical Corporation, Trenton, N. J., a corporation of Delaware No Drawing. Application January 21, 1953, Serial No. 332,534

3 Claims. (Cl. 260—79.7)

This invention relates to new copolymers of vinyl compounds formed by the reaction of monomeric vinyl compounds with cyclic monomeric disulfides.

The principal object of the invention is to provide sulfur containing vinyl copolymers having new and useful properties.

It is a further object of the invention to copolymerize vinyl monomeric compounds, especially those of the group consisting of styrene, butadiene, methylmethacrylate, butyl acrylate, vinyl chloride, vinyl acetate, vinylidene chloride and acrylonitrile with a cyclic monomeric disulfide.

It has been found that when a cyclic monomeric disulfide is reacted with a vinyl monomeric compound according to the present invention, polymerization continues as distinguished from the so called "chain transfer" reaction which takes place when said vinyl monomeric compounds are reacted with open chain disulfides such as dibutyl disulfide and alkyl disulfides in general, with termination of that chain, and initiation of a new chain.

When the open chain monomeric disulfides react by the socalled chain transfer process, the molecular weight, i. e. the average molecular weight of the products, is much lower than is the case in the present invention where the cyclic monomeric disulfides are employed. In the latter case the chain transfer process is completely absent and a true copolymerization process occurs with accompanying improved properties attributable to the much higher molecular weight which is obtained.

In accordance with the present invention a vinyl monomer of the group consisting of styrene, butadiene, methylmethacrylate, butyl acrylate, vinyl chloride, vinyl acetate, vinylidene chloride and acrylonitrile, is reacted with a cyclic monomeric disulfide and a new copolymer is obtained having substantially improved properties in relation to the corresponding vinyl homopolymer. For example, a copolymer of styrene and cyclic diethyl ether disulfied may be obtained according to the present invention, which is more resistant to solvents and more flexible as compared with the corresponding conventional polystyrene.

The cyclic monomeric disulfides used in the present invention have the general formula

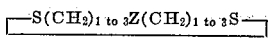

where Z is a member of the group consisting of —O—, —S—, —OCH₂O—, —SCH₂S—, —OC₂H₄O—, —CH₂—, —SC₂H₄S—, —RCH—, and —R′N—, R and R′ being members of the group consisting of hydrogen, alkyl, aryl, and aralkyl radicals, examples of such radicals being methyl, ethyl, propyl, n-butyl, n-amyl, benzyl and phenyl. Illustrative specific compounds falling within this general formula are given below:

(1)
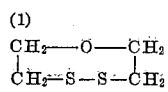

(1A)
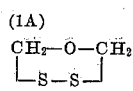

(1B)
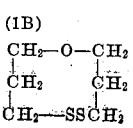

(2)        (2A)       (2B)
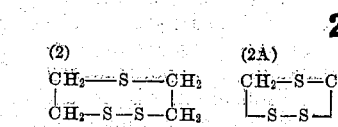

(3)        (3A)       (3B)
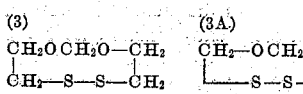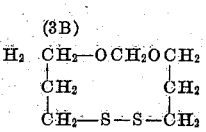

(4)        (4A)       (5B)
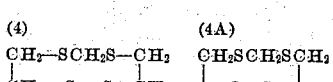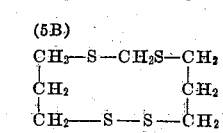

(5)        (5A)       (5B)
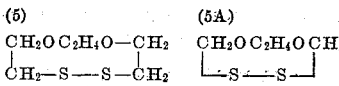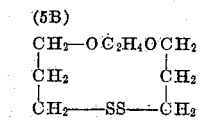

(6)        (6A)       (6B)
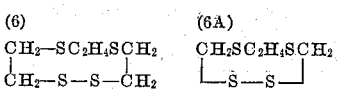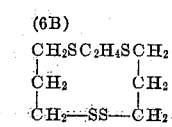

(7)        (7A)       (7B)
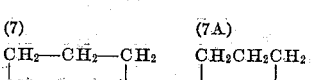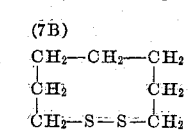

(8)
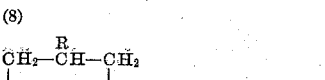

(9)
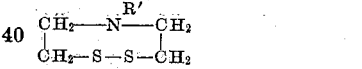

Applicants make no claim herein to the cyclic monomeric disulfides per se or methods of making them or polymerizing them per se, the present invention contemplating only the copolymerization thereof with vinyl monomers as described and claimed in this application.

The cyclic monomeric disulfides used in the present invention and methods of making them and polymerizing them per se are disclosed in the copending application of Franklin O. Davis, Serial No. 240,067, now Patent No. 2,657,198.

A method of making said cyclic monomeric disulfides will be illustrated by a method of making compound No. 1 above, 1 oxa, 4-5 dithia cycloheptane, as shown in said Davis application.

PRODUCTION OF COMPOUND 1

Three mols, for example, 972 cc. of 3.09 molar Na₂S₄.₂₇ was treated with one gram of the sodium salt of butyl napthalene sulfonic acid, eight grams of sodium hydroxide and 25 grams of MgCl₂.6H₂O, the said sodium hydroxide and magnesium chloride each being used as approximately 25 per cent solutions. This reaction mixture was heated to a temperature of 140° F. and there was added to this reaction mix 2.7 mols (386 grams) of ClC₂H₄OC₂H₄Cl. The feed period was 90 minutes during which a latex formed in the reaction. This latex was distilled with steam until 1000 cc. of distillate had been collected in order to remove all of the congeneric 1,4-thioxane formed in the reaction. After one washing the latex was treated with 4.5 mols (180 grams) sodium hydroxide for one hour at 180° F. The latex was washed free of polysulfide solution and subjected to steam distillation. The distillate in this case was cloudy with droplets of oil settling out. Decantation gave approximately 1½ grams of oil per 500 cc. of distillate but this amount could be somewhat increased by extraction with ethyl ether. Although the rate of formation of the oil, as evidenced by its rate of removal in the steam distillation, was quite slow, it continued practically unchanged for a considerable period of time, for example, about two months of distillation. If other halides are used other polymers are obtained which give different cyclic materials having different physical properties and different degrees of stability. To produce Compound 1A, proceed as above using dichloro methyl ether instead of bis B-chlorethyl ether.

The remaining monomeric cyclic disulfides listed above may be similarly prepared, by substituting in the above example the appropriate polysulfide polymer having repeating units

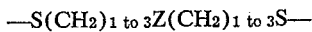

and which by said distillation undergo a rearrangement with formation of the corresponding cyclic disulfide

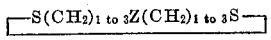

The copolymerization of the vinyl monomers and the cyclic monomeric disulfides can occur as a bulk copolymerization or as an emulsion or suspension copolymerization. The monomeric compounds will react at least as low as ordinary room temperature, e. g. 25° C., but higher temperatures may be employed if desired to accelerate the reaction and in some cases, e. g. temperatures of 60–90° C. or even higher, up to say 150° C. The reaction temperature may also be as low as 0° C. since the reactants in general are very reactive. The reaction will occur in the absence of a catalyst but is facilitated, that is, speeded up, by free radical type vinyl polymerization catalysts in general. That term is well known in the art of polymerizing vinyl compounds and such catalysts are illustrated by 2-azo bis isobutyronitrile and benzoyl peroxide. The molar ratio of the vinyl monomer to the cyclic monomeric disulfide may vary from as low as 1:1 to as high as 25:1. If a catalyst is used, the proportion thereof may be from 0.1 to 1.0 mol per cent of the total weight of reactants.

The invention will be defined in the claims and purely for purposes of illustration the following specific examples are set forth:

In the following examples the term "ring compound" means the cyclic monomeric disulfide which in all examples was compound No. 1, i. e. 1 oxa-4,5 dithia cycloheptane, which may also be designated cyclic diethyl ether disulfide. However, cyclic monomeric disulfides, in general, and any cyclic monomeric disulfide shown in the above list thereof, can be substituted in said examples, for 1 oxa-4,5 dithia cyclo heptane, in the same molar proportion as shown in said examples.

The emulsion copolymerization of the following examples were carried out using approximately a 10 to 1 molar ratio of vinyl monomer to ring compound for all of the monomers. In the case of butadiene, in addition to the 10 to 1 ratio a 5 to 1 ratio was also used. The emulsifier used in these examples was made up by dissolving in 750 ml. of water 25 grams of "Dresinate 731" which is a concentrated solution of a sodium soap of rosin having a solids content of 70% by weight. 54 ml. of the resulting dilute solution of emulsifier was used in all examples exececpt 19 and 20 wherein 61 ml. of the emulsifier solution was used.

*Example 1*

This example illustrates the copolymerization of styrene and ring compound in emulsion polymerization using an azo catalyst.

82 grams (0.8 mol) of styrene
7 grams (0.05 mol) of ring compound
7.2 grams (0.044 mol) of 2 azo bis isobutyronitrile as catalyst were reacted in emulsion polymerization at 60° C. for 24 hours. This resulted in a latex which on coagulation with dilute HCl gave a copolymer having 2.48% sulfur in a 96% yield. This copolymer was dissolved in benzene and precipitated by methanol 3 times and was a white solid.

*Example 2*

This example illustrates the emulsion copolymerization of styrene and ring compound using benzoyl peroxide as catalyst.

82 grams (0.8 mol) of styrene
7 grams (0.05 mol) of ring compound
10.6 grams (0.044 mol) of benzoyl peroxide were reacted in emulsion polymerization and a small quantity of copolymer was obtained. This copolymer analyzed 8.39% of sulfur and was a white solid.

*Example 3*

This example typifies bulk polymerization using an azo catalyst.

8.7 grams (0.083 mol) of styrene
1.2 grams (0.0083 mol) of ring compound
0.72 gram (0.0044 mol) of 2 azo bis isobutyronitrile as catalyst were reacted at room temperature for 10 days and gave a total conversion to a copolymer which analyzed 8.85% sulfur and was a white solid.

*Example 4*

Proceed as in Example 3 using a temperature of 60° C. for 4 days. A total conversion took place. The copolymer, after 2 purifications by precipitation from chloroform solution using methanol as the precipitant, analyzed 1.65% sulfur and was a white solid.

*Example 5*

Proceed as in Example 3 using a temperature of 90° C. for 4 days. A total conversion was obtained. The purified copolymer, treated by double purification using precipitation from a chloroform solution by methanol, gave 0.83% sulfur and was a white solid.

*Example 6*

This example typifies copolymerization of butadiene and the ring compounds using emulsion polymerization and an azo catalyst. The ratio of butadiene to the ring compound in this example is a molar ratio of approximately 5 to 1.

50 grams (0.92 mol) of butadiene
28.8 grams (0.19 mol) of ring compound
0.75 gram (0.0055 mol) of 2 azo bis isobutyronitrile were reacted in emulsion polymerization as described above at 60° C. for 24 hours. The crude material analyzed 14.3% sulfur and was a rubbery solid.

*Example 7*

This example illustrates an emulsion polymerization using an azo catalyst.

27 grams (0.5 mol) of butadiene
7 grams (0.052 mol) of ring compound.
0.37 gram (0.0028 mol) of azo bis isobutyronitrile were reacted in emulsion polymerization at 60° for 48 hours. A brown rubbery copolymer was obtained which analyzed 0.4% sulfur.

Example 8

This example illustrates the bulk polymerization of methyl methacrylate and ring compound using benzoyl peroxide as a catalyst.

50 grams (0.5 mol) of methylmethacrylate
6.8 grams (0.05 mol) of ring compound
0.68 gram (0.0028 mol) of benzoyl peroxide were reacted in bulk polymerization at 60° C. for 10 days and total conversion was obtained. The copolymer was dissolved in chloroform and precipitated by methanol. It analyzed 12.38% sulfur and was a solid, glassy material.

Example 9

Proceed as in Example 8 except use a temperature of 90° C. and a reaction time of 4 days. This reaction gave a total conversion. The copolymer was purified by precipitation, using methanol as precipitant, from a chloroform solution and gave, on analysis, 2.5% sulfur and was a solid glassy material.

Example 10

This example illustrates the bulk polymerization of butyl acrylate and the ring compound using an azo catalyst.

64 grams (0.5 mol) of butyl acrylate
6.8 grams (0.05 mol) of ring compound
0.46 gram (0.0028 mol) of 2 azo bis isobutyronitrile as catalyst were mixed. This mixture was reacted in bulk polymerization conditions for 10 days at room temperature and gave total conversion. The crude copolymer thus obtained contained 7.05% sulfur and had a consistency similar to chicle.

Example 11

Proceed as in Example 10 using instead of room temperature a temperature of 60° C. and a time of 4 days. This resulted in a total conversion of the reactants and a copolymer having a sulfur content of 7.48% and a consistency similar to chicle.

Example 12

Proceed as in Example 10 using instead of room temperature 90° C. and polymerization for 4 days. This resulted in total conversion and a copolymer containing 2.17% sulfur and had a consistency similar to chicle.

Example 13

This example illustrates the bulk copolymerization of vinyl chloride and the ring compound using an azo catalyst. The reagents were:

62.5 grams (1.0 mol) of vinyl chloride
13.4 grams (0.1 mol) of ring compound
0.92 gram (0.0055 mol) of azo bis isobutyronitrile The reaction was carried out at room temperature for 10 days and a black, tarry copolymer was obtained.

Example 14

This example illustrates further bulk copolymerization of vinyl chloride and the ring compound using an azo catalyst.

75 grams (1.2 mol) vinyl chloride
16.3 grams (0.12 mol) of ring compound
1.1 grams (0.0066 mol) of 2 azo bis isobutyronitrile as catalyst were reacted in bulk polymerization to give a black tar-like copolymer which possessed 46.8% sulfur and 1.41% chlorine.

Example 15

This example illustrates bulk polymerization of vinyl chloride and the ring compound using benzoyl peroxide as catalyst.

62.5 grams (1.0 mol) of vinyl chloride
13.4 grams (0.1 mol) of ring compound
1.33 grams (0.0055 mol) of benzoyl peroxide were reacted at room temperature for 10 days. A small amount of black copolymer formed.

Example 16

Proceed as in Example 15 except using 60° C. for 48 hours for polymerization. A black liquid polymer resulted, which on analysis gave 43.45% sulfur and 1.1% chlorine.

Example 17

Proceed as in Example 15 except using a temperature of 90° C. and 48 hours for polymerization. A black liquid polymer containing 45.45% sulfur and 1.88% chlorine was obtained.

Example 18

This example illustrates the bulk polymerization of vinyl acetate and ring compound using an azo catalyst.

86 grams (1.0 mol) of vinyl acetate
13.4 grams (0.1 mol) of ring compound
9.92 grams (0.0055 mol) of 2 azo bis isobutyronitrile were reacted at 60° C. for 7 days. A light clear viscous polymer was obtained which had 16.71% sulfur.

Example 19

Example illustrating emulsion copolymerization of vinylidene chloride and the ring compound. React:

80 grams (0.82 mol) vinylidene chloride
7 grams (0.05 mol) of ring compound
0.5 gram (0.31 mol) of 2 azo bis isobutyronitrile as catalyst
61 ml. of rosin soap solution (prepared as in the preamble to the examples)

After emulsification, copolymerization occurred during 17 hours at 6° C. Yield was 56% crude insoluble solid polymer having 2.01% sulfur and 64.9% chlorine.

Example 20

Proceed as in Example 10 using 41 grams (0.72 mol) of acrylonitrile instead of the vinylidene chloride and for 16.5 hours at 60° C. The conversion was quantitative. Sulfur analysis averaged about 3.8% sulfur. The product was an organic solvent insoluble, solid polymer.

Example 21

React:
2.55 grams of cyclic diethyl ether disulfide
2.72 grams of styrene for 48 hours at 130° C. followed by 48 hours at 150° C. in the absence of catalyst. The reaction was carried out in a tube from which oxygen was rigorously excluded. The polymer resulting at the end of the reaction was precipitated in methanol and amounted to 4.37 grams and was a white solid.

Example 22

React:
1.274 grams cyclic diethyl ether disulfide
2.72 grams of styrene under the same conditions as given in Example 21, using no catalyst. The polymer was obtained in a yield of 3.25 grams and was a white solid.

Example 23

Proceed as in Example 21 using 0.637 gram of ring disulfide and 2.72 grams of styrene to obtain a white solid.

Example 24

Proceed as in Example 21 using 0.382 gram of ring disulfide and 2.72 grams of styrene to obtain a white solid.

Example 25

Proceed as in Example 21 using 0.1274 gram of ring disulfide and 0.905 gram of styrene.

The results obtained in Examples 21 to 25 are shown in the table below. Two facts are especially noteworthy. The copolymerization effected in the presence of large amounts of ring disulfide gave a larger weight of copolymer than the weight of styrene incorporated in the charge. Also, the number of sulfur atoms per chain in the case of these copolymers was much larger than 2, whereas, in the case of polymers prepared where an open chain disulfide is used, the number of S atoms is not greater than 2.

| Example | g. Ring Disulfide | g. Styrene | Molar Ratio, Styrene/RDS | Total Wgt. Copolymer | S, Percent | S Atoms per Chain | $[n]$ | $\bar{M}_n$ |
|---|---|---|---|---|---|---|---|---|
| 21 | 2.55 | 2.72 | 1.45 | 4.37 | 9.20 | 7.34 | 0.948 | 2750 |
| 22 | 1.274 | 2.72 | 2.79 | 3.25 | 5.43 | 11.1 | 0.094 | 6560 |
| 23 | 0.637 | 2.72 | 5.45 | 2.86 | 2.72 | 6.75 | 0.109 | 7950 |
| 24 | 0.382 | 2.72 | 9.3 | 2.53 | 0.96 | 4.56 | 0.175 | 15200 |
| 25 | 0.127 | 0.905 | 4.63 | 2.56 | 1.05 | 17.2 | 0.492 | 52500 |

$[n]$ is the intrinsic viscosity.
$\bar{M}_n$ is the number average molecular weight.
RDS means ring disulfide, i. e. cyclic monomeric disulfide.

Each of those facts demonstrates that a true copolymerization occurs when the cyclic monomeric disulfide reacts with the vinyl monomer, as distinguished from the reaction of open chain disulfides with vinyl monomers where chain growth is terminated or precluded.

We claim:

1. The process of copolymerizing a cyclic monomeric disulfide and an unsaturated monomer which comprises reacting a compound selected from the group consisting of styrene, butadiene, methylmethacrylate, butyl acrylate, vinyl chloride, vinyl acetate, vinylidene chloride and acrylonitrile with a monomeric cyclic disulfide having the general formula:

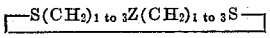

wherein Z is a member of the group consisting of —O—, —S—, —OCH₂O—, —SCH₂S—, —OC₂H₄O—, —CH₂—, —SC₂H₄S—, —RCH—, and —R'N—, R and R' being members of the group consisting of hydrogen, alkyl, aryl, and aralkyl radicals, the molal ratio of said unsaturated monomer to said cyclic disulfide being from 1:1 to 25:1.

2. The process of claim 1 wherein said reaction is carried out at a temperature of 0° to 150° C.

3. A copolymer of a monomeric unsaturated compound of the group consisting of styrene, butadiene, methylmethacrylate, butyl acrylate, vinyl chloride, vinyl acetate, vinylidene chloride and acrylonitrile and a cyclic monomeric disulfide having the general formula:

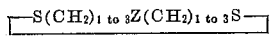

wherein Z is a member of the group consisting of —O—, —S—, —OCH₂O—, —SCH₂S—, —OC₂H₄O—, —CH₂—, —SC₂H₄S—, —RCH—, and —R'N—, R and R' being members of the group consisting of hydrogen, alkyl, aryl, and aralkyl radicals, the molal ratio of said unsaturated monomer to said cyclic disulfide being from 1:1 to 25:1.

References Cited in the file of this patent

UNITED STATES PATENTS 2,347,182    Coffman _____ Apr. 25, 1944